(12) United States Patent
Van Den Tillaart

(10) Patent No.: US 7,536,547 B2
(45) Date of Patent: May 19, 2009

(54) SECURE DATA TRANSMISSION IN A NETWORK SYSTEM OF IMAGE PROCESSING DEVICES

(75) Inventor: Robertus C. W. T. M. Van Den Tillaart, Gemert (NL)

(73) Assignee: Oce-Technologies B.V., Venlo (NL)

( * ) Notice: Subject to any disclaimer, the term of this patent is extended or adjusted under 35 U.S.C. 154(b) by 803 days.

(21) Appl. No.: 10/997,960

(22) Filed: Nov. 29, 2004

(65) Prior Publication Data

US 2005/0154884 A1    Jul. 14, 2005

(30) Foreign Application Priority Data

Nov. 27, 2003 (EP) .................. 03078762

(51) Int. Cl.
*H04K 1/00* (2006.01)
*H04L 9/00* (2006.01)

(52) U.S. Cl. ...................... 713/165; 713/184

(58) Field of Classification Search ............. 713/165, 713/184
See application file for complete search history.

(56) References Cited

U.S. PATENT DOCUMENTS

| | | | | |
|---|---|---|---|---|
| 6,978,299 | B1 * | 12/2005 | Lodwick | ............ 709/223 |
| 2002/0078351 | A1 * | 6/2002 | Garib | ............ 713/168 |
| 2002/0184494 | A1 | 12/2002 | Awadalla | |
| 2003/0014640 | A1 | 1/2003 | Loyd | |
| 2003/0204747 | A1 | 10/2003 | Gaebel et al. | |

FOREIGN PATENT DOCUMENTS

| | | |
|---|---|---|
| EP | 0929023 A1 | 7/1999 |
| EP | 1 045 574 A1 | 10/2000 |
| EP | 1 091 285 A2 | 4/2001 |
| EP | 1359728 A2 | 11/2003 |
| WO | WO-01/95558 A1 | 12/2001 |
| WO | WO-02/41133 A2 | 5/2002 |

* cited by examiner

*Primary Examiner*—Kambiz Zand
*Assistant Examiner*—Aubrey H Wyszynski
(74) *Attorney, Agent, or Firm*—Birch, Stewart, Kolasch & Birch, LLP

(57) ABSTRACT

A method and apparatus for secure transmission of digital document data between multiple devices are provided. At a sending station, a document file is generated and a user-defined character string is inputted by an operator in the local user interface. Then, the sending station automatically forms an encryption key based on the user-defined character string and encrypts the document file therewith. However, one or more predetermined specifying header items of the file are not encrypted, to facilitate recognition and handling of the file. A transmission file, including the encrypted document file, is then transmitted towards a receiving station, where the encrypted document file is decrypted based on the same user-defined character string entered at the sending station, when the latter is entered in the local user interface of the receiving station. Even though the transmission file is encrypted, the unencrypted header items enable file handling, such as routing, and accounting.

22 Claims, 4 Drawing Sheets

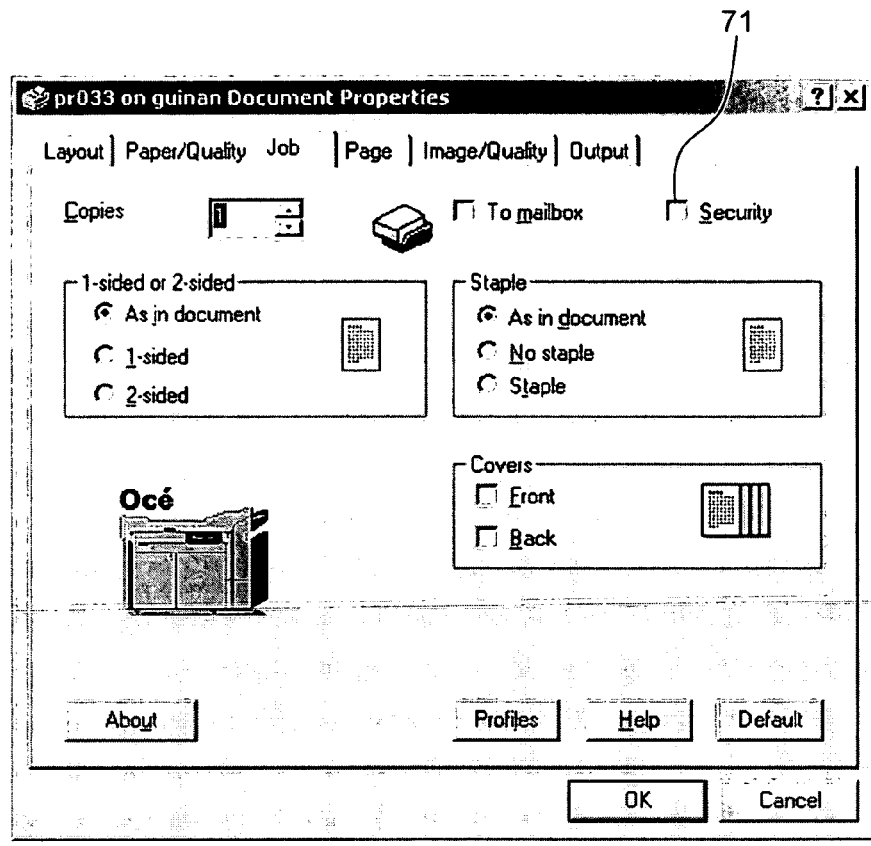
Fig. 4
Fig. 5
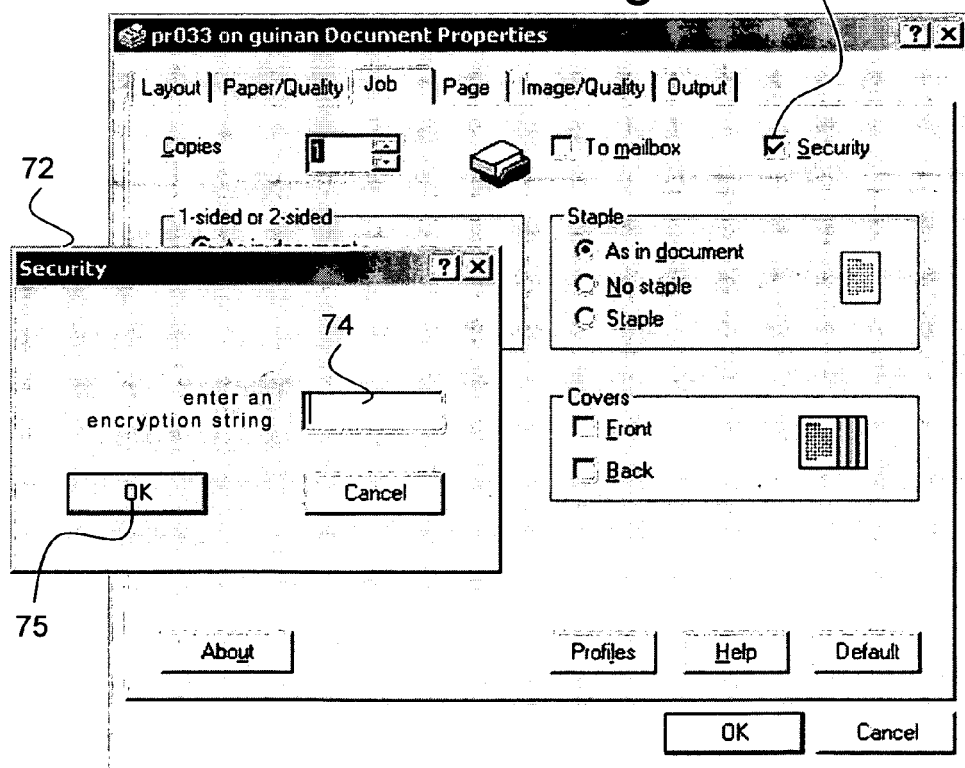

SECURE DATA TRANSMISSION IN A NETWORK SYSTEM OF IMAGE PROCESSING DEVICES

The present application claims under 35 U.S.C. § 119, the benefit of European Patent Application No. 03078762.6 filed Nov. 27, 2003, the entire contents of which are herein fully incorporated by reference.

BACKGROUND OF THE INVENTION

1. Field of the Invention

The invention relates to a method of secure transmission of digital data relating to a document between any of a scanner, a printer and a host computer such as a user workstation, interconnected by a digital network.

2. Discussion of the Background Art

Nowadays, the generating and printing of documents must comply with various different levels of security. Furthermore, various printing organizations/configurations exist that may introduce distances both in time and in space between the generating of the document and the printing proper thereof. Such distances may have various aspects, such as: generating a document at home and using the Internet for transferring to/printing at the Office; composing a document and putting it in a printing queue that resides in a Mailbox of a shared printer, e.g. Océ 3165™, such as through storing on a hard disk that is located therein; letting the electronic version of a printed document after actual printing thereof remain stored for a certain interval of time, such as twenty-four hours, in an intermediate storage facility that is more or less freely accessible, and various others.

In particular, European Patent Application Publication No. A1 0 929 023 discloses a secure printing approach wherein the document is encrypted with a session key and according to a bulk encryption algorithm, and furthermore the session key is encrypted with the intended recipient's public key (PUK). The complete print job is then transmitted to a document store. The recipient will use a so-called smart card containing his private key (PRK) for authentifying to the printer; the latter takes the identity from the card to search for documents intended for the recipient; these are then sent from the document store to the secure printer which first decrypts the session key using the recipient's PRK and then uses the decrypted session key to decrypt and print the document.

The method in the above-mentioned reference, although offering a certain degree of security, still is vulnerable to dedicated code-breaking techniques. The transmitted encrypted document file still includes information that can be used to decrypt it. In particular, the encrypted session key may be extracted from the transmitted file and, since it is relatively short, the session key may be decrypted by a massive trial-and-error attack.

Moreover, the method in the above-mentioned reference is less flexible on the basis of an individual document. For example, the recipient must have a smart card which requires physical transport thereof, but on the other hand, the recipient will then be able to view all documents intended for the assumed holder of the card. The above-mentioned reference does not provide for individual access to just one document. Furthermore, before transmitting of the document, the sender must know the intended recipient's identity, which is not always feasible.

Further, WO 02/41133 discloses a printing system including a print job source, such as a user PC including a print driver, a spooling server and a printer having a polling device. Print jobs are encrypted at the print job source, using an encryption key based on user-specified data, and transferred to the spooling server. In the spooling server the print job is decrypted and stored. The polling device in the printer may then poll the spooling server for any jobs intended for the printer. If there is such a print job at the spooling server, the latter re-encrypts the print job with the same key and sends the job to the printer polling device, where a user must input the same user-specified data. Based on those, the polling device forms a key, decrypts the print job and forwards it to the printer.

According to the disclosure of WO 02/411133, the print job is completely encrypted, and therefore becomes an unrecognizable block of data. It can therefore only be handled by a system that knows what it is beforehand, such as in point-to-point transfers, or decrypts it to get more information. Yet, intermediate decryptions decrease the job security and should therefore be avoided.

Likewise, US 2002/0078351 A1 discloses a system in which a file is encrypted for a point-to-point transfer, using a key that is entered both at the sending site and at the receiving site. The file itself can no longer be recognized once it is encrypted.

SUMMARY TO THE INVENTION

The inventor has recognized a need for enhanced security, so that unauthorized access to classified and other restricted print-ready information should be minimized, whilst remaining user friendly as much as possible. Also, other transmissions of data, in particular document-related data such as scan files generated by scanning a document and document files for storage in a database, must be secure in order to prevent eavesdroppers from getting access to the contents of certain secret or confidential documents.

In consequence, amongst other things, it is an object of the present invention to improve the security level of the schemes of the background art. Moreover, the invention provides a well balanced approach that trades off between smooth access and document managing functions on the one hand versus a high security level on the other hand.

Therefore, according to one of the aspects of the invention, the encrypting step at the sending station automatically leaves one or more specifying header items in the document file as unencrypted.

Where in the known prior art encrypted files are "blind" data blocks, they are according to the present invention still recognizable from the specifying header items that remain intelligible and can be used for handling. Examples of such specifying items may be the name of the owner, the name of the receiver, number of copies, number of pages.

Such information may effectively be used before the actual printing, such as for accounting or for other control purposes, such as the routing in a multi-printer system, possibly routing to a repro department.

Also, it may be used in so-called interactive printing as is implemented in, e.g., Océ 3165™ machine, according to which print files are never printed immediately upon reception at the printer, but rather are stored in a logical storage space in the printer memory dedicated to the owner of the print job, and presented for selection to a local operator and subsequent printing. A user may walk up to the printer, call up a list of print jobs he has sent on the local display and select one or more thereof. Then, upon actuation of the PRINT key on the operating panel, the jobs are printed. Normally, in interactive printing, the job names are specified in the displayed list.

However, in an embodiment of the present invention, the name of the job should preferably not be in the file header in unencrypted form, as such would give an unwanted party a first useful amount of information. As an alternative therefore, the name of the job may be changed into a non-informational character string or by a date/hour-compound, either by the owner himself or by the printer driver.

In a particular embodiment, the forming of a print job with encrypted and non-encrypted header items may be effected by (1) forming an additional file containing metadata relevant for the document file but not including any decryption clue, the additional file having a first part and a second part, and (2) encrypting only one of the first and second parts of the additional file using the same encryption key as was used for encrypting the document file, wherein in the step of forming a transmission file, the additional file is included in the transmission file.

In a further embodiment, the sending station splits a transmission file into two parts and first transmits only one part of the transmission file to the receiving station. The receiving station, upon an operator selection of such transmission file, sends a request to the sending station, to transmit the remaining part of the transmission file.

For example, the splitting may be done between header information and the rest of the file, or may be done through the whole file by taking a fixed section of each byte that must go to the receiver, such as the first half of every byte and sending only that part of each byte with the rest being retained.

The invention also relates to a method for secure transmission of files other than print files, such as scan files for storage at, e.g., the user's workstation. Further, the invention relates to a system of data processing devices, which system is adapted for secure transmission of digital data relating to a document between them.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures wherein:

FIG. 4 illustrates a first screen displayed at an intended printing system;

FIG. 5 illustrates a second screen displayed at an intended printing system.

DETAILED DESCRIPTION OF PREFERRED EMBODIMENTS

Figure 1:
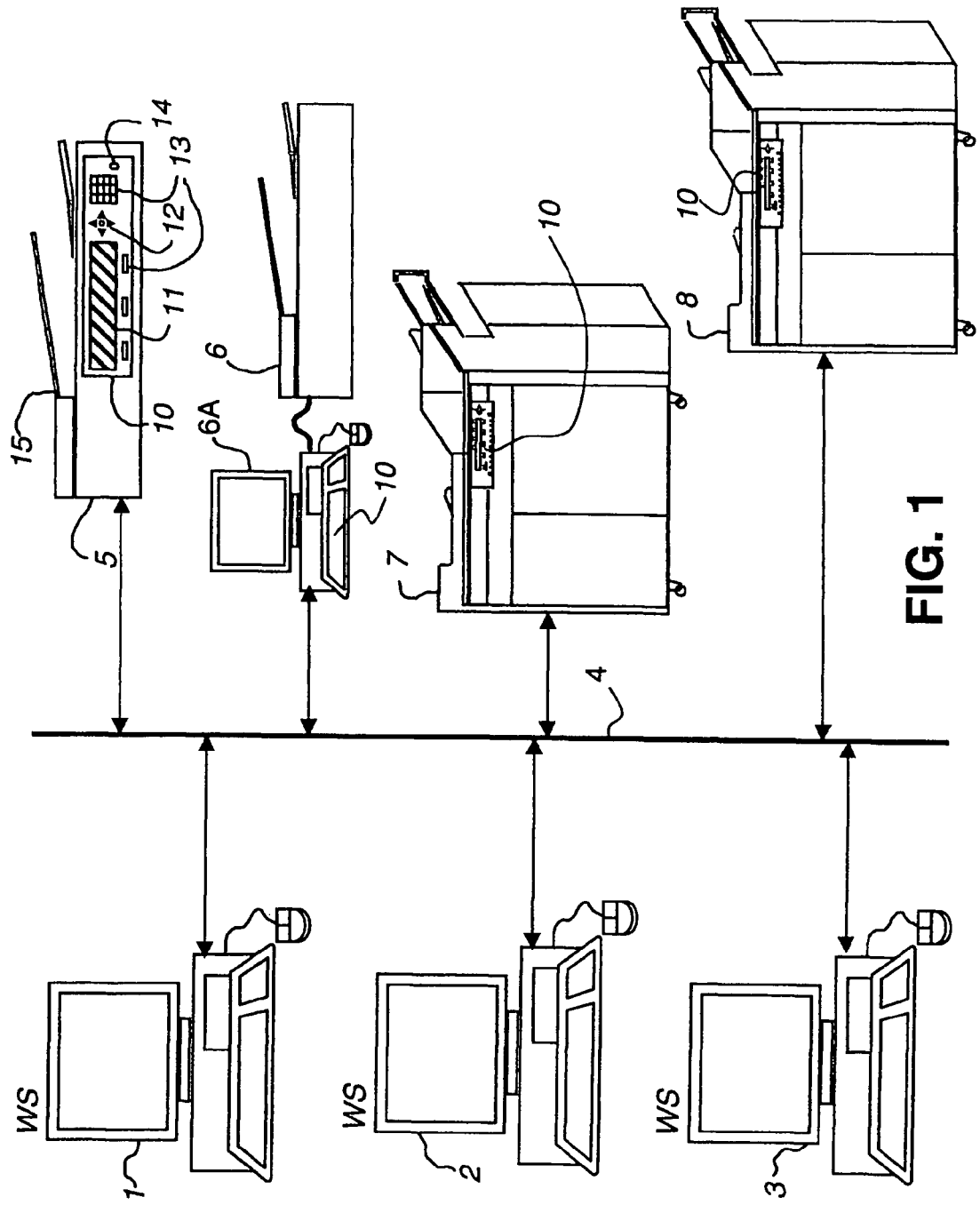
FIG. 1 illustrates a diagram of a network system with printers, scanners and workstations according to an embodiment of the invention.

FIG. 1 is a diagram of a network system showing a procedure according to a printer embodiment of the invention. The system comprises a plurality of workstations 1, 2 and 3 for users, a plurality of scanners 5, 6, and one or more printers 7, 8. All components of the system are operatively coupled. The scanners and printers are provided with their own operator control unit (not shown separately), equipped with an operator control part 10 such as keys 12, 13, 14 and/or a display 11, possibly in the form of an external operator control unit 6A, such as a PC. Where printers are in fact multifunctional digital copying machines (7, 8), the scanners of these machines may also be used as separate scanner devices. All these elements are interconnected by means of a network such as a local network 4, to which they are connected.

Figure 2:
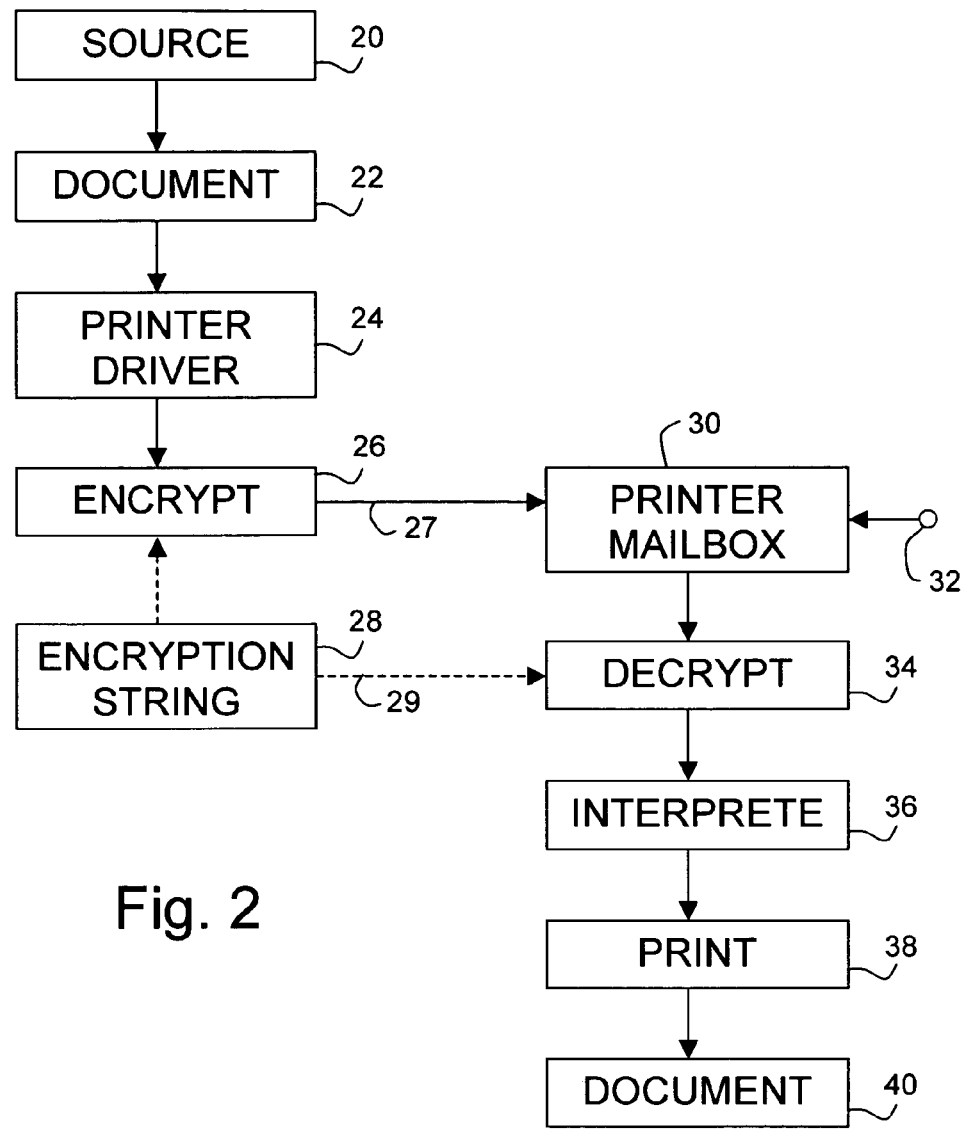
FIG. 2 illustrates a block diagram of a procedure according to a printer embodiment of the invention.

FIG. 2 illustrates a block diagram of an overall system of a printer embodiment of the present invention. The processing steps provided by the system in FIG. 2 can be implemented by the network system of FIG. 1.

Referring to FIG. 2, the processing document source 20 may represent any appropriate item for sourcing, such as typewriting, drawing, visual image pickup, and others. The document 22 from the document source 20 is forwarded to a printer driver 24. The printer driver 24 is generally a software module located at the document source 20, such as the originator's personal computer or work station (e.g., 1, 2, 3 in FIG. 1). In the configuration considered, the printer driver 24 is associated with an encryption procedure 26 that uses an encryption key 28 to implement the encryption process. Various such procedures are in wide use, such as DES, RSA, and others. The encryption key 28 is session-specific and based on an encryption string entered by the operator in the printer driver 24 as will be explained below.

The document source 20, such as the user's personal computer, is generally considered sufficiently safe to store the encrypted version of the document. Note that also a non-encrypted version may reside there. The PC in question will become somewhat more vulnerable as it will have an open communication port. Another variant can have the encrypted job plus ticket on a dedicated server.

Next to the print data, that is generally encrypted completely, a document will usually contain so-called metadata, which represent some description of the document or its intended use, such being included in what is colloquially called a document header. For example, the document header contains the name of the owner and of the intended user (which may be the same) without encryption, but does not contain any information of the encryption string, neither encrypted, nor in cleartext.

Preferably, the actual encryption key 28 used by the encryption algorithm is a function of the inputted encryption string entered by the operator. An elementary embodiment of such function is through concatenating the inputted encryption string with a standard string of characters, but more complex functions for this purpose are feasible as well. This latter feature implies that the inputting of a dummy encryption string or even omitting thereof will nevertheless ensure that no unencyphered data will be transmitted.

Now, various fields in the job-ticket or document header may be encrypted as well, but certain specifying fields of the header should better remain in cleartext, such as those that specify the number of copies and pages, respectively, of the document, since such fields may effectively be used before the actual printing, such as for accounting or for other control purposes, such as the routing in a multi-printer system. Such accounting functions may be effected on an intermediate server not shown in FIG. 2. The above-mentioned routing may comprise routing to a (possibly) external repro department. Also the owner's name would be in cleartext.

Also, the unencrypted header items may be used in so-called interactive printing as is implemented in, e.g., Océ 3165™ machine, according to which print files are never printed immediately upon reception at the printer, but rather are stored in a logical storage space in the printer memory dedicated to the owner of the print job, and are presented for selection to a local operator and subsequent printing. A user may walk up to the printer, call up on the local display a list of print jobs he has sent and select one or more thereof. Then, upon actuation of the PRINT key on the operating panel, the jobs are printed.

Normally, in interactive printing, the job names are specified in the displayed list.

However, in the present invention, the name of the job should preferably not be in the file header in unencrypted form, as such would give an unwanted party a first useful amount of information. As an alternative therefore, the name of the job may be changed into a non-informational character string or by a date/hour-compound, either by the owner himself or by the printer driver.

According to a first embodiment of the invention, the job is encrypted (26) with the above function of the encryption key 28 (based on the operator-entered encryption string) and subsequently transferred to a mailbox 30 of the printer (e.g., 7, 8, in FIG. 1). In the printer, the name of the intended user is extracted from the document that is loaded into the printer mailbox 30, such as for signalling in the personal mailbox (not shown specifically) of the addressee. For actual printing, the user actuates the mailbox 30 to select the document with an appropriate control signalization 32, and inputs on a request through a forced dialogue a decryption string into a decryption module 34 of the printer. As shown in line item 29, the decryption string in the decryption module 34 is identical to the encryption string used in the encrypting stage 26. The decryption module 34 of the printer has information on the algorithm for forming the encryption key on the basis of the user-entered encryption string used in the printer driver 24 and forms a decryption key accordingly.

The transfer of the decryption string may proceed in any appropriate manner, such as through carrying by the owner, or through any feasible communication outside connection 27, such as through a hatched connection 29. As shown, the relation between the encryption/decryption string and the document is immediate, in that no physical intermediate such as a smart card is necessary, which has the advantage that print files can be shared with other persons by simply spelling the encryption/decryption string out to them. Neither is a temporal intermediate present, such as an organizational delay between decrypting and printing other than associated to the printing operation itself.

The actual network transport of the encrypted file may be done through permutation of data blocks, such as through hashing the encryption string and possibly date and time. Furthermore, fake data blocks may be inserted into the data stream in a pseudo-random manner. The seed item for the pseudo-random generator may be based on the encryption string and/or date and time. Consequently, an eavesdropper will first have to correct the data sequence, followed by undertaking the decrypting, which greatly enhances the data security.

Immediately after decryption, the document is printed (38) and thus becomes available in hardcopy 40. If the wrong decryption string were entered, the printing procedure will only produce "garbage", if at all the file would still be printable, but the decryption string itself will still not be checked. In consequence, the whole path from the sourcing of the document until the effective printing is protected by encryption, and no long-term exposure to malevolent inspection by an unwanted party remains. In other known organizations, such exposure could in fact amount to various hours, but even several seconds could already be detrimental to security.

According to a particular embodiment, the job ticket may include an encrypted code string or "signature", encrypted by the same encryption algorithm, for faster checking if the entered decryption string is the correct one. In this way, only a small part of the file may be decrypted for on the basis thereof detecting that "garbage" is being produced, rather than decoding the bulk of the document. Of course, an appropriate diversification of the signature, such as between various destinations or customers, will improve security. The size of the signature string may lie in a range from 0.1 to 1 kilobyte, and thus be considerably smaller than the print file itself.

The above finding of "unable to print" could have some other cause than the entering of a wrong decryption string, or rather the decryption string could have been unintentionally in error. However, a particular threshold number of failing print undertakings could represent an intended fraud. Therefore, when the number of "misses" exceeds a predefined threshold number, the document is automatically deleted from the printer storage. This threshold number may be adjustable, and certain ones or all of such failed printings may be logged and/or reported.

Next to the advantages of the invention already discussed, the following can be listed as well. The document remains encrypted until immediately before printing. Therefore, even physically removing the printer's hard disk will not infringe security. The printing job may also be (re)routed to a different location for printing than originally intended without risk. Next to the features discussed supra, the application of so-called secure sockets may implement a further line of defence against infringers.

According to a second embodiment of the present invention, a still raised degree of security above the one(s) considered hereabove is attained by delaying the transmission of the encrypted print data of a print job at least in part until receiving an actual printing command. Advantageously, instead thereof a minimal ticket is transmitted which only comprises the user name and some document identification. Only if the user reports at the printer and selects the job, the document data and the remainder of the ticket will be fetched. This will further minimize the time interval spent by the document outside the trusted environment. Also, the document will not be stored persistently at the printer when the actual printing will for some reason be foregone. A minor disadvantage of this practice may be that the transfer of the document will somewhat delay the printing after the receiving of the printing command.

A variation on the above "Just In Time" procedure is that only a fraction, such as one half, of the encrypted document is transferred before receiving the actual printing command. The rest will then remain encrypted at the source facility. The way of choosing is such that the portion of the document so transferred does not present useful information to the imposter. According to an embodiment, the present inventor considers a very useful algorithm for implementing this choosing procedure to be taking a fixed section of each byte of the document that must go to the receiver, such as the first half of every byte, and sending only that part of each byte but retaining the rest. Even in possession of the encryption string, the document part located on the printer cannot be decyphered. This feature will lessen the transfer time when requesting to print, versus holding back the full document, by a factor of about 2. It is possible to hold back other fractions of the encoded document, each such choice causing a specific trade-off. The splitting of data may be done under control of an additional parameter that renders the split of each particular byte (or other information entity) seemingly unpredictable. In practice, an algorithm associated to the encryption string may produce a bit string, of which the one's would control the transfer, whereas the zero's would control holding back of a bit or fractional byte. An incidental advantage of the holding back is the lesser storage requirement at the printer.

A still further variation on sending the minimum ticket is to only signal the presence of a secure document at the source. In this case, each document will next to a encryption string need an identifier code. Upon requesting a print operation, first the identifier must be presented at the printer. Absence of the document at the source is logged to further protect the document name, at a price of requiring extra interaction between the printer and source.

Figure 3:
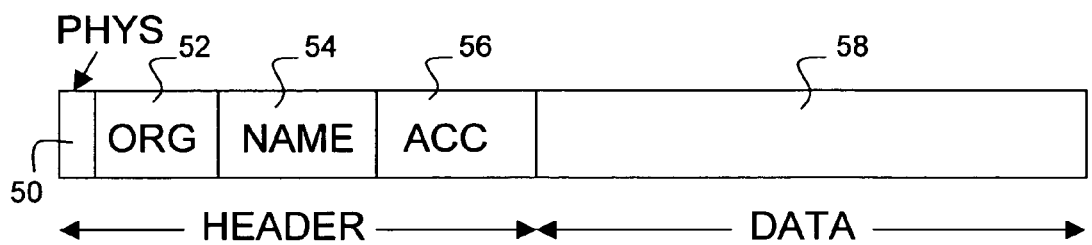
FIG. 3 illustrates a document format for use with the invention.

FIG. 3 illustrates a document format for use with the invention, effectively shown as a bit string. The document starts with a header at left. First part 50 relates to low-level organization, such as to categorize a document with encryption, the document size, etc. Block 52 specifies organizational aspects of the document, such as the owner and/or the intended receiver. As discussed supra, this information is preferably not encrypted. Block 54 recites the name or other identification of the document and further such information, which as discussed supra preferably has been encrypted. Block 56 recites accounting and control information that preferably is not encrypted, inasmuch as they may serve a purpose independent from the printing. Finally, block 58 includes the encrypted data of the document.

FIGS. 4 and 5 relate to the encrypting procedure of the present invention. FIG. 4 illustrates a first printer driver window 70 displayed at the user's workstation display screen, most elements of the screen being standard in a WINDOWS® environment. In particular, a security field 71 has been indicated. If no security according to the invention is required, the user may select printing parameters and click "OK". If security is required, the user must tick the security field 71, and the display will change to FIG. 5. This illustrates a second window 72 displayed at the user's workstation display screen, after ticking the security field 71 in FIG. 4. This will prompt the user to fill in the encryption string field 74 and give local "OK" 75 at left.

As furthermore shown in FIGS. 4 and 5, various printing parameters may be selected, such as choosing between single-sided and double-sided, stapling or not, putting covers on the document, and selecting image quality, number of copies, and various other parameters. Now, for adherence to a house style, economy, and various other reasons, it has been found to control by centralized measures the printing functionality of printer drivers on the level of individual users. In the context of the present invention, envisioned enforcement would include forced security and, e.g., minimum encryption string length, but examples of other uses would be: forced duplex, forced mailbox, forced usage of certain fonts of character size (larger size allowed for visually handicapped persons), disable printer driver altogether, disallowance of printing to file, explicit file location for printing to file such as to a hot directory, etc. Various users can have a broader range of functionalities and/or facilities.

A particularly advantageous embodiment of the invention is to give the IT manager a central database which stores various aspects that specify the printer driver for a respective user. This may be implemented as a rule-based system which greatly reduces the interaction complexity for the IT manager. Now, the printer driver will, for every print job submission or periodically such as every morning, connect to the database to check its current configuration. As the driver pops up, it will adapt its User Interface and User Functionality according to current specification. If the server cannot be reached, either the actual settings of the printer driver will be used as a default, or alternatively, printing will be blocked for the time being. One of the advantages of this embodiment is that permissions may be changed real-time, even such as according to fixed hour/day time-schedules or upon instantaneous emergencies. The above database may be centralized, or alternatively be replicated on every printer or printer location.

The latter version can also involve the printer, in that the latter will check the actual job ticket for conformance to the permissions defined in the database. This will enforce a policy of the IT manager. In particular, when the security option is enforced, the printer may automatically delete any print file that is not encrypted.

When the encrypted print file is selected for printing at the printer location, the operator is requested, through a forced dialogue, to enter the decryption string (which is identical to the encryption string) at the operating panel. Next, the printer applies the decryption algorithm to the file, using the entered decryption string, and if the entered decryption string is correct, the decrypted file is usable and the printer can print it. If, however, the entered decryption string is not correct, the file will not be printable and the printer will indicate so on the local display. The user may then cancel and retry locally, or cancel printing completely.

The whole printing operation according to the second embodiment, starting from the source or workstation location, may be now summarized as follows:

User wants to print a document (document content presumed ready)

Printer driver asks for an encryption string for therewith encrypting the document Driver encrypts the document and stores it on the local workstation disk To indicate that a secure user job is waiting at a workstation in question, the printer driver sends a minimum ticket to the selected printer; if applicable, also part of the encrypted document User reports at the printer device, authenticates, and gets a list of his jobs User selects the secure job; only the device as identified by its IP address that has received the minimum ticket may fetch the remainder of the job data Printer disactivates "Operating System Swapping", and will from now on be active in (volatile) memory only; this prevents a non-encrypted version of the document or a key from appearing in a swapfile on the disk Printer fetches the remainder of the job data Printer requests the user to enter a decryption string Printer decrypts the document in its memory and prints the document ready for use Printer deletes the document from the memory and reactivates "Operating System Swapping".

In another embodiment, the user-defined character string used for forming the encryption string is not as such entered by the user, but is automatically derived from a biometric characteristic, such as a retina scan or a fingerprint scan, taken from the user. Both the user workstation and the printer include a device for measuring the biometric characteristic such as a fingerprint scanner, which measures and analyses the biometric data and derives a data string therefrom. The latter is then used for forming the encryption key.

The requirement that the user enter the character string is replaced by a requirement to have the relevant biometric characteristic scanned, such as putting his finger on a fingerprint scanner. Alternatively, the user workstation may store the biometric characteristic of the user (or the character string based on it) in a secure place in advance and use it for the encryption. This embodiment has an advantage in that the user is not required to memorize a character string for forming an encryption string.

The secure procedure described above can also advantageously be employed in other document-related file transfers, such as for scanning. Generally, scanning is performed in a networked system such as shown in FIG. 1 by a scanner device 5, 6 or scanner module of a multi-functional device 7, 8, and scan data are then transmitted to an intended user workstation 1, 2, 3 via the network 4. The scan data may also first be stored in encrypted form at a local data storage associated with the scanner or to a server and then be fetched by a user workstation.

Figure 6:
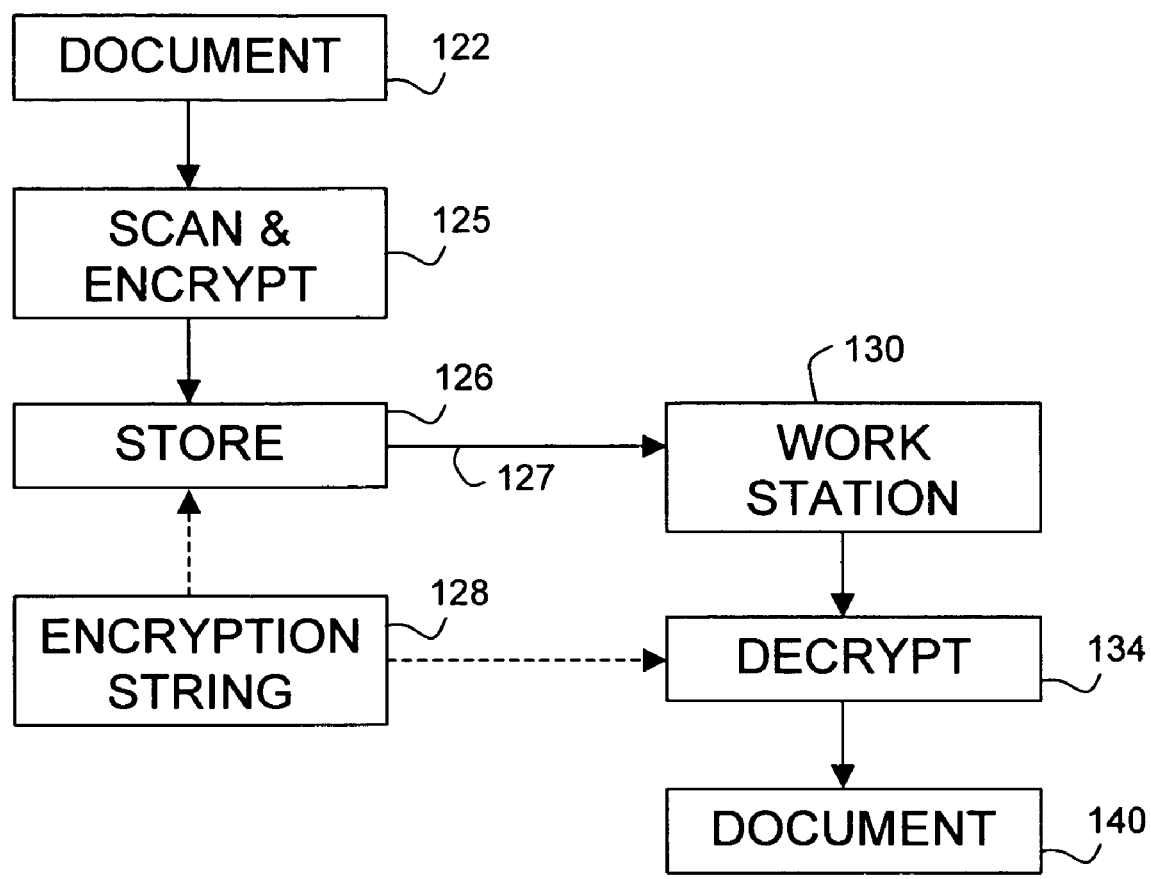
FIG. 6 illustrates a block diagram of a procedure according to a scanner embodiment of the invention.

FIG. 6 illustrates a block diagram of a procedure according to a scanner embodiment of the invention wherein the above-discussed secure procedure is applied in scanning. The processing steps of FIG. 6 can be implemented in the system of FIG. 1. Referring to FIG. 6, a physical document 122 is positioned on the scanner platen of a scanner, or in a document feeder associated thereto, and at the same time an encryption string 128 is entered in the scanner user interface. Then, at block 125, the scanner scans the document and immediately encrypts the document file generated by the scan process, using an encryption key based on the encryption string 128 in the same way as decribed for the printer driver above. The encrypted document file is stored (126) in the scanner and transmitted (130) to a designated destination, such as the operator's workstation.

Then, the intended recipient may enter the encryption string 128 into the user interface of a decryption module 134 in the workstation, and in reaction, the encrypted document file is decrypted (134) into a ready-for-use document file 140.

In a first embodiment of the above scanner application, the encrypted scan file is automatically transmitted by the scanner to the destination workstation that has been specified by the scanner operator at the initialization of the scan job. A prerequisite is, in this embodiment, that the workstation should be operative and waiting for the scan file to arrive. An advantage is, that the encrypted document file is in the "public" domain for a short time only, because it is transmitted immediately after it has been generated.

In a second embodiment of the above scanner application, the encrypted scan file is stored on the scanner disk and waits there until it is fetched by the workstation. Web applications for connecting a workstation to a scan server, selecting a file in the scan server storage and transferring a selected file through a secure connection to the destination workstation are widely known. The transferred scan file may then be decrypted in the above-described way.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Now, the present invention has hereabove been disclosed with reference to preferred embodiments thereof. Persons skilled in the art will recognize that numerous modifications and changes may be made thereto without exceeding the scope of the appended claims. In consequence, the embodiments should be considered as being illustrative, and no restriction should be construed from those embodiments, other than have been recited in the claims.

The invention claimed is:

1. A method for securely transmitting digital data relating to a document between a scanner, a printer and a host computer, interconnected by a digital network, the method comprising the steps of:

at a sending station:
generating a document file through a data source, receiving a session-specific user-defined character string from an operator,
automatically forming an encryption key based on the user-defined character string,
encrypting the document file to produce an encrypted document file, using the encryption key, while automatically leaving one or more predetermined specifying header items in the document file as unencrypted,
forming a transmission file including the encrypted document file, and
transmitting the transmission file towards a receiving station; and at the receiving station:
storing the received transmission file,
receiving the same user-defined character string by from operator,
automatically forming a decryption key based on the user-defined character string, and
decrypting the encrypted document file to a decrypted document file, using the decryption key, the method further comprising:
at the sending station:
forming an additional file containing metadata relevant for the document file but excluding any decryption clue, the additional file having a first part and a second part, and
encrypting only one of the first and second parts of the additional file, using the same encryption key used for encrypting the document file,
wherein in the step of forming the transmission file, the additional file is included in the transmission file.

2. The method of claim 1, wherein the steps performed at the receiving station are performed without a validity check of the user-defined character string.

3. The method of claim 1, wherein said unencrypted specifying header items are items suitable for accounting purposes.

4. The method of claim 1, wherein said unencrypted specifying header items are items suitable for routing of the transmission file in a multi-printer system.

5. The method of claim 1, wherein the sending station splits the transmission file into two parts and first transmits only one part of the transmission file to the receiving station, and wherein the receiving station, upon an operator selection of the transmission file, sends a request to the sending station, to transmit the remaining part of the transmission file.

6. The method of claim 5, wherein the sending station scrambles transmitted files by block permutation.

7. The method of claim 5, wherein the sending station checks an identity of the requesting receiving station, and only if the requesting station is authorized, transmits the requested transmission file part.

8. The method of claim 1, wherein the sending station splits the transmission file using a splitting algorithm based on the level of an elementary data item.

9. The method of claim 1, wherein the receiving station performs a decryption of the transmission file and a processing of the decrypted document file in volatile memory only.

10. The method of claim 1, wherein the receiving station is a printer having a local user interface for inputting, by an operator, the character string used to form the decryption key.

11. The method of claim 10, wherein the printer extracts the non-encrypted part of the transmission file and uses data contained therein to present the relevant document file at its local user interface to be selected by an operator for printing.

12. The method of claim 10, wherein the sending station includes a printer driver with an optional setting for secure print data transmission, and the method further comprises overruling, from a central place in the network, any optional security setting so that secure data transmission is forcedly selected.

13. The method of claim 10, wherein the sending station first sends only the non-encrypted part of the transmission file to the printer, the receiving station uses data contained in the non-encrypted part to present the relevant document file at its local user interface to be selected by an operator for further processing, and the receiving station, upon an operator selection of a document file, sends a request to the sending station, to transmit the relevant transmission file.

14. The method of claim 1, wherein the sending station is a scanner having a local user interface and requests an operator to input an encryption string in advance of a scanning process.

15. A system including at least two image processing devices, and adapted for secure transmission of digital data relating to a document between the at least two image processing devices, the system comprising:
a sending station including:
    a user interface for inputting a session-specific user-defined character string by an operator,
    a key former for automatically forming an encryption key based on the user-defined character string,
    an encryption module for encrypting a document file to produce an encrypted document file, using the encryption key, while automatically leaving one or more predetermined specifying header items in the document file as unencrypted,
    a file former for forming a transmission file including the encrypted document file, and
    a transmitter for transmitting the transmission file towards a receiving station; and a receiving station including:
    a receiver for receiving the transmission file from the sending station,
    a storage unit for storing the received transmission file,
    a user interface for inputting a user-defined character string by an operator,
    a second key former for automatically forming a decryption key based on the input user-defined character string, and
    a decryption module for decrypting the encrypted document file to a decrypted document file, using the decryption key,
wherein the sending station further includes:
    a module for forming an additional file containing metadata relevant for the document file but not including any decryption clue, the additional file having a first part and a second part, and
wherein the encryption module also encrypts only one of the first and second parts of the additional file using the same encryption key used for encrypting the document file, and the additional file is included in the transmission file.

16. The system of claim 15, wherein the receiving station excludes means for checking validity of the user-defined character string inputted at the user interface of the receiving station.

17. The system of claim 15, wherein the sending station further includes a file splitter for splitting the transmission file into two parts, the transmitter first transmits only one part of the transmission file to the receiving station, and the receiving station further includes a requester for, upon an operator selection of a transmission file on the user interface of the receiving station, sending a request to the sending station, to transmit the remaining part of the transmission file.

18. The system of claim 15, wherein the decryption module and any module in the receiving station intended for processing the decrypted document file work in volatile memory only.

19. The system of claim 15, wherein the receiving station is a printer.

20. The system of claim 19, wherein the sending station includes a printer driver for secure transmission of print data to the receiving station.

21. The system of claim 15, wherein the receiving station is a multiple-printer system.

22. The system of claim 15, wherein the sending station is a scanner.

* * * * *